United States Patent
Ushimaru

[11] Patent Number: 5,879,581
[45] Date of Patent: Mar. 9, 1999

[54] COMPOSITION FOR USE IN REFRIGERATION CYCLE AND REFRIGERATING APPARATUS

[75] Inventor: Shigeo Ushimaru, Kawasaki, Japan

[73] Assignee: Kabushiki Kaisha Toshiba, Kawasaki, Japan

[21] Appl. No.: 769,315

[22] Filed: Dec. 19, 1996

Related U.S. Application Data

[63] Continuation of Ser. No. 404,837, Mar. 14, 1995, abandoned.

[30] Foreign Application Priority Data

Mar. 15, 1994 [JP] Japan .................................. 6-043485

[51] Int. Cl.$^6$ ...................................................... C09K 5/04
[52] U.S. Cl. ................................... 252/68; 252/67; 62/85
[58] Field of Search ............................ 252/68, 67; 62/85

[56] References Cited

U.S. PATENT DOCUMENTS

| | | | |
|---|---|---|---|
| 5,026,531 | 6/1991 | Tannous et al. | 423/328 |
| 5,045,295 | 9/1991 | Tannous et al. | 423/716 |
| 5,185,092 | 2/1993 | Fukuda et al. | 252/565 |
| 5,347,822 | 9/1994 | Lavin et al. | 62/85 |
| 5,395,544 | 3/1995 | Hagihara et al. | 252/68 |
| 5,425,242 | 6/1995 | Dunne et al. | 62/85 |

FOREIGN PATENT DOCUMENTS

| | | |
|---|---|---|
| 3-93880 | 4/1991 | Japan . |
| 327968 | 11/1994 | Japan . |

OTHER PUBLICATIONS

Cohen, "Compatibility and Performance of Molecular Sieve Desiccants", Sci. Tech. Froid., pp. 21–28. 1994.

*Primary Examiner*—Christine Skane
*Attorney, Agent, or Firm*—Finnegan, Henderson, Farabow, Garrett & Dunner, L.L.P.

[57] ABSTRACT

In a composition for use in a refrigeration cycle which comprises at least a hydrofluorocarbon, a refrigerator oil, and a desiccating agent, the desiccating agent possesses a capacity for adsorption of difluoromethane of less than 2.77% by weight as determined by the McBain method. This desiccating agent is a sodium.potassium A type zeolite which has a sodium content of not less than 6% by weight, a potassium content of not less than 5% by weight, and a total sodium and potassium content in the range of from 13 to 20% by weight. Owing to the use of the desiccating agent of this quality, the water concentration in the refrigeration cycle can be lowered without entraining decomposition of such a Flon alternative as difluoromethane which is used in the place of dichlorodifluoroethane or monochlorodifluoromethane.

9 Claims, 1 Drawing Sheet

COMPOSITION FOR USE IN REFRIGERATION CYCLE AND REFRIGERATING APPARATUS

This application is a continuation of application Ser. No. 08/404,837 filed Mar. 14, 1995, now abandoned.

BACKGROUND OF THE INVENTION

1. Field of the Invention

This invention relates to a composition for use in a refrigeration cycle, particularly a composition for a refrigeration cycle using a hydrofluorocarbon type refrigerant, and a refrigerating apparatus using the composition.

2. Description of the Related Art

The use of such chlorine-containing Flons as dichlorodifluoroethane (hereinafter referred to as "CFC12"), monochloro-difluoromethane (hereinafter referred to as "HCFC22"), and R-502 which is an azeotropic mixture of HCFC22 with CFC115 will be banned because they have been established as refrigerants which are associated with the depletion of the ozonosphere. As prospective alternatives to these Flons, such hydrofluorocarbon type refrigerants as difluoromethane (hereinafter referred to as "HFC32"), pentafluoroethane (hereinafter referred to as "HFC125"), 1,1,1, 2-tetrafluoroethane (hereinafter referred to as "HFC134a"), 1,1,1-trifluoroethane (hereinafter referred to as "HFC143a"), and 1,1-difluoroethane (hereinafter referred to as "HFC152a") which avoid depleting the ozonosphere have been being studied for their feasibility as simple compounds or mixtures. Meanwhile, the development of a refrigerating apparatus which operates by the use of this hydrofluorocarbon type refrigerant has been being urged.

The refrigerating apparatus is represented by an air conditioner, a refrigerator, or the like which incorporates therein a refrigeration cycle consisting of the four actions, i.e. evaporation, compression, condensation, and expansion. In the refrigeration cycle, the refrigerant is circulated while repeating changes from liquid to gas and gas to liquid. The refrigeration cycle has further contained in the system thereof a refrigerator oil and a desiccating agent. The refrigerator oil is used herein particularly for lubrication in the compression mechanism part. For the sake of the return of the oil within the cycle, the refrigerator oil is required to manifest compatibility with the refrigerant as an indispensable property. Since the aforementioned alternative Flons show practically no solubility to the mineral oil heretofore used as the refrigerator oil, the feasibility of such refrigerator oils as polyol ester type oils and polyether type oils which show solubility to the hydrofluoro-carbon type refrigerant is now being studied. The prospective refrigerator oils include polyalkylene glycol oils and polyalkyl benzene type oils as well.

The drier is packed with the desiccating agent and then disposed in the refrigeration cycle for eliminating water from the cycle.

As the desiccating agent, the sodium A type zeolite which is designated as the 4A type has been heretofore used in the refrigeration cycle which comprises CFC12, R-502, and the HCFC22 type refrigerant and a mineral oil.

The alternative Flons mentioned above and such refrigerator oils as polyester type oils and polyether type oils share the quality of high absorbency and possibly entail entrance of a large volume of water into the refrigeration cycle. This entrance of water opens up the possibility that the water will freeze inside the capillary tube and will consequently induce hydrolysis of the refrigerant and the refrigerator oil, deterioration of the materials forming the system with an acid component produced inside the cycle, and occurrence of oil slags. For the refrigeration cycle which uses an alternative Flon and a polyester type oil or a polyether type oil which fits the alternative Flon, therefore, the removal of this water constitutes itself an important task.

When the conventional sodium A type zeolite is used in the refrigeration cycle using an alternative Flon for the purpose of lowering the water concentration in the cycle, however, the refrigeration cycle will be at a disadvantage in incurring decomposition of the Flon which is formed solely of HFC32 or of a mixture containing HFC32 and, at the same time, exerting an adverse effect also on the A type zeolite, and eventually failing to attain sufficient removal of the water.

SUMMARY OF THE INVENTION

An object of this invention, therefore, is to obtain a desiccating agent which is capable of reducing the water concentration or the like in the refrigeration cycle without entraining the decomposition of the alternative Flon.

Another object of this invention is to obtain a composition to be used in the refrigeration cycle without exerting any adverse effect on the sliding mechanism part of the refrigeration cycle.

Yet another object of this invention is to obtain a refrigerating apparatus which excels in durability owing to the use therein of the composition for refrigeration cycle mentioned above.

The composition of this invention for use in refrigeration cycle is characterized by using a desiccating agent whose capacity for adsorption of HFC32 determined by the McBain method is less than 2.77% by weight. The expression "composition for use in refrigeration cycle" as used in this invention refers to the aggregate of refrigerant, refrigerator oil, desiccating agent, and the like which is used in the refrigeration cycle.

Then, the composition of this invention for use in refrigeration cycle is characterized by using as a desiccating agent a sodium.potassium A type zeolite having a sodium content of not less than 6% by weight, a potassium content of not less than 5% by weight, and a total sodium and potassium content in the range of from 13 to 20% by weight. Further, this sodium.potassium A type zeolite is characterized by comprising a purely synthetic zeolite formed of sodium aluminosilicate and having an average pore diameter of not more than 0.3 nm.

The composition for use in refrigeration cycle mentioned above is characterized by the hydrofluorocarbon containing at least HFC32.

The refrigerating apparatus of this invention comprises a closed refrigeration cycle using a refrigerant, a refrigerator oil, and a desiccating agent and consisting of the steps of compressing, condensing, expanding, and evaporating the refrigerant, and characterized in that the refrigerant is a hydrofluorocarbon type refrigerant and the desiccating agent is a substance having a capacity for adsorption of HFC32 of less than 2.77% by weight as determined by the McBain method.

DESCRIPTION OF THE PREFERRED EMBODIMENTS

Figure 1:
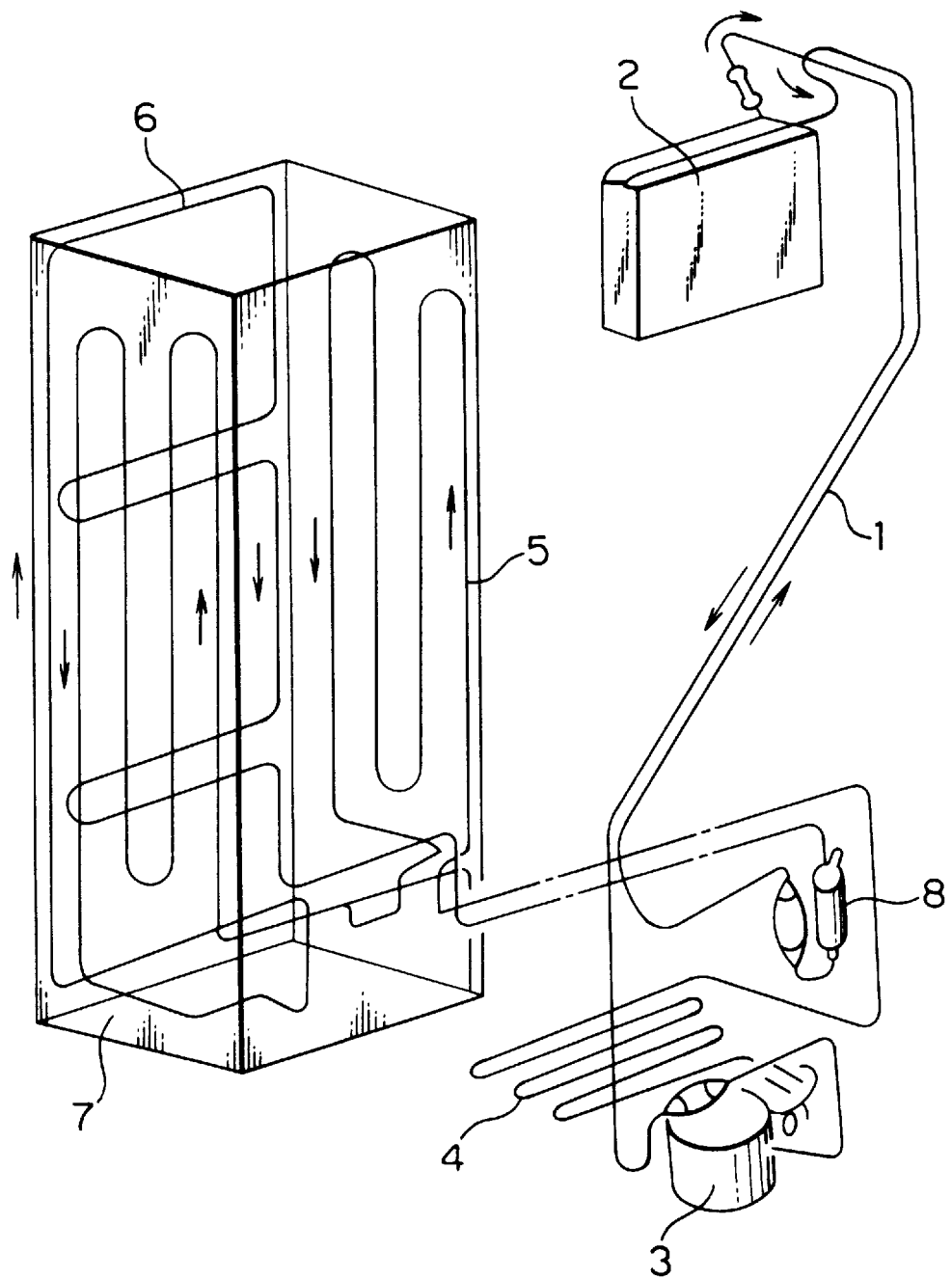
FIG. 1 is a diagram showing the refrigeration cycle.

In the composition of this invention for use in refrigeration cycle, the hydrofluorocarbon type refrigerant is a compound which is formed of carbon, fluorine, and hydrogen atoms and is used as an alternative to such conventional refrigerants as CFC12 and HCFC22. As concrete examples of the hydrofluorocarbon type refrigerant, HFC32, HFC125, HFC134a, HFC143a, and HFC152a may be cited. These hydrofluorocarbons may be used either singly or in the form of a mixture of two or more members. Among other refrigerants cited above, such hydrofluoro-carbons as possess small molecular diameters and especially contain at least HFC32 therein prove particularly desirable. As desirable hydrofluorocarbons, such mixed refrigerants as HFC32/HFC125, HFC32/HFC152a, HFC32/HFC134a, HFC32/HFC125/HFC134a, and HFC32/HFC125/HFC134a/R290 and simple HFC32 refrigerant may be cited.

The preferred desiccating agent contemplated by the present invention is a sodium.potassium A type purely synthetic zeolite which is formed of sodium aluminosilicate. Generally, the A type zeolites are purely synthetic zeolites which are not found in the natural world. They are characterized by possessing definite pore diameters approximating the sizes of relatively simple molecules and adsorbing only molecules which have diameters smaller than the pore diameters. Because of this quality, they are called molecular sieves and are used as a desiccating agent for a refrigerant. The A type zeolites include sodium A type zeolites which have sodium mainly as cations in zeolite and designated as the 4A type and potassium A type zeolites having potassium mainly as cations and designated as the 3A type.

The pore diameters of a molecular sieve are varied when the metallic ions (such as Na, K, and Ca) positioned in the neighborhood of the maximum oxygen cycle restrain part of the pores and the number and the positions of the metallic ions or the radii of the ions are varied by ion exchange. The pore diameters in the sodium A type are about 0.4 nm, whereas the pore diameters of the potassium A type which has K having a large ion radius (theoretical radius: 0.152 nm) in the place of Na having a small ion radius (theoretical radius: 0.116 nm) are about 0.3 nm.

When the theoretical molecular diameters of hydrofluorocarbons and water are compared, it is noted that HFC32 which has the smallest theoretical molecular diameter in all the hydrofluorocarbons has 0.33 nm and water has 0.28 nm respectively as theoretical molecular diameters. It has been heretofore held, therefore, that the potassium A type zeolite is adapted for use as a desiccating agent in the composition to be used in the hydrofluorocarbon type refrigeration cycle.

The use of the potassium A type zeolite desiccating agent in the composition for the hydrofluorocarbon type refrigeration cycle, however, has not necessarily brought about satisfactory results.

After various studies on the conventional sodium A type zeolites with respect to the ratio of sodium cations to potassium cations, the inventors have found that sodium-.potassium A type zeolites containing sodium and potassium cations in prescribed amounts have only small capacities for adsorption of HFC32 and cause no decomposition thereof. The present invention has been perfected on the basis of this knowledge.

The desiccating agent contemplated by this invention is a substance whose capacity for adsorbing HFC32 as determined by the McBain method is less than 2.77% by weight. If this capacity for adsorption exceeds 2.77% by weight, the desiccating agent will be at a disadvantage in tending to induce decomposition of HFC32, for example. The more desirable capacity for adsorption which avoids inducing the decomposition of HFC32 is not more than 1.5% by weight.

As concrete examples of the desiccating agent which answer this description, sodium.potassium A type zeolite and potassium A type zeolite may be cited.

The sodium.potassium A type zeolite contemplated by this invention is a purely synthetic zeolite formed of sodium alumino-silicate. When this zeolite has a sodium content of not less than 6% by weight, a potassium content of not less than 5% by weight, and a total sodium and potassium content in the range of from 13 to 20% by weight, the capacity for adsorption of HFC32 can be lowered and the water concentration in the refrigeration cycle can be decreased. For the purpose of more perfectly lowering the capacity for adsorption and the water concentration, it is desirable that the sodium content be not less than 7% by weight, the potassium content not less than 6% by weight, and the total sodium and potassium content in the range of from 13 to 16% by weight.

The refrigerating apparatus contemplated by this invention comprises a refrigeration cycle using a desiccating agent whose capacity for adsorbing HFC32 as determined by the McBain method is less than 2.77% by weight. The desiccating agent of this quality is capable of exclusively adsorbing and removing the contained water without entraining any adsorption of the refrigerant in the refrigeration cycle. When this desiccating agent is used, therefore, the possibility that the water will freeze inside the capillary tube and will consequently induce hydrolysis of the refrigerant and the refrigerator oil, deterioration of the materials forming the system with an acid component produced inside the cycle, and occurrence of oil slags can be alloyed. As concrete examples of the refrigerating apparatus contemplated by this invention, refrigerators, air conditioners, show cases, refrigerator cars, vending machines, and beer servers may be cited.

The refrigerator oil, to be effectively used in the present invention, is only required to possess compatibility with the hydrofluorocarbon type refrigerant. As concrete examples of the preferable refrigerator oil, polyol ester type oils, polyether type oils, fluorine type oils, and polyalkylene glycols may be cited. Such alkylbenzene type oils and mineral oils as are deficient in compatibility are also usable.

The desiccating agent contemplated by this invention discharges the following function in the refrigeration cycle.

Some of the metallic ions (cations of Na, K, and Ca, for example) in the zeolite assume positions having no bearing on the function of a molecular sieve and other metallic ions are present in pores affecting the function of the molecular sieve. It is thought that the pore diameters are varied by the latter metallic ion species.

The sodium.potassium A type zeolite contemplated by this invention is believed to be capable of exchanging the Na ion which has an adverse effect on the function of a molecular sieve for the K ion. It, therefore, possesses a pore diameter (not more than 0.3 nm) equal to or less than the pore diameter of the potassium A type zeolite. It is, consequently, capable of exclusively adsorbing and removing the water content without entraining any adsorption of the refrigerant in the refrigeration cycle. Since the adsorption does not easily occur, the HFC32 succumbs only sparingly to thermal decomposition. As a result, the deterioration of the materials forming the refrigeration cycle and the occurrence of oil slags can be allayed.

This invention will be further illustrated by the following examples.

Example 1

Varying species of the sodium.potassium A type zeolite conforming to the present invention were tested for capacity for adsorbing HFC32 in accordance with the McBain method. The samples of sodium.potassium A type zeolite were also assayed for Na and K contents. The results are shown in Table 1. For the purpose of comparison, a sodium A type zeolite (4A type) and a potassium A type zeolite (3A type) were similarly tested. The results are also shown in the table.

TABLE 1

| Sample | Composition (% by weight) | | | Capacity for adsorbing HFC32 (% by weight) |
|---|---|---|---|---|
| | Na content | K content | Total Na + K content | |
| A | 6.4 | 5.5 | 11.9 | 14.80 |
| B | 4.2 | 10.0 | 14.2 | 2.77 |
| C | 7.9 | 6.5 | 14.4 | 0.28 |
| D | 7.0 | 6.0 | 13.0 | 0.37 |
| E | 6.5 | 7.5 | 14.0 | 0.76 |

Note)
Sample A: Sodium A type zeolite (4A type)
B: Potassium A type zeolite (3A type, K rich)
C: Sodium.potassium type A zeolite (Na.K A type)
D: Sodium.potassium type A zeolite (Na.K A type)
E: Sodium.potassium type A zeolite (Na.K A type)

It is noted from the results of Table 1 that the species of sodium.potassium A type zeolite had markedly small capacities for adsorption of HFC32. This fact indicates that the sodium.potassium A type zeolite confirming to this invention tends to adsorb water exclusively and does not easily entrain any decomposition of HFC32.

The same samples were tested for ratio of decomposition of HFC32 by the use of an autoclave. The results are shown in Table 2. The autoclave test was carried out by sealing about 10 g of an ester type refrigerator oil, 10 g of a refrigerant HFC32, and about 100 g of a sample zeolite in an autoclave (240 ml in inner volume) made of stainless steel and allowing the autoclave to stand in a constant temperature bath kept at 60°, 120°, or 175° C. for 500 hours. After 500 hours' aging, the sample zeolite was removed from the bath and assayed to determine the ratio of decomposition of the refrigerant HFC32. This ratio of decomposition of the refrigerant HFC32 is the quotient in percentage of the F ion concentration in the sample zeolite divided by the F atom content of the HFC32.

TABLE 2

| Sample | The ratio of decomposition of HFC32 at aging temperature | | |
|---|---|---|---|
| | 60° C. | 120° C. | 175° C. |
| A | 1.01% | 5.37% | 23.82% |
| B | 1.02% | 3.07% | 7.41% |
| C | 1.00% | 1.28% | 1.94% |
| D | 1.01% | 1.51% | 2.16% |
| E | 1.00% | 1.72% | 3.04% |

It is noted from the results of Table 2 that the samples C to E of sodium.potassium A type zeolite did not easily induce decomposition of the refrigerant HFC32 at an elevated temperature of 175° C. as compared with the sample A and sample B of zeolite and that particularly the sample C and sample D which had sodium contents of not less than 7% by weight, potassium contents of not less than 6% by weight, and total sodium and potassium contents of not less than 13% by weight showed excellent ratios of decomposition of HFC32 of about 2% in the autoclave test at 175° C. Between the sample C and the sample D, the sample C which had a sodium content of not less than 7.9% by weight, a potassium content of not less than 6.5% by weight, and a total sodium and potassium content of 14.4% by weight proved more suitable.

The data indicate that when the sodium.potassium A type zeolite contemplated by this invention is used as a desiccating agent in the refrigeration cycle using a refrigerant formed solely of HFC32 or a mixture containing HFC32 among other HFC type refrigerants, it permits effective removal of water from the refrigeration cycle and exalts the reliability of the function of the refrigeration cycle.

Then, the zeolite samples mentioned above were tested for rupture strength and ratio of abrasion.

The rupture strength was determined by the measurement of compressive strength and the ratio of abrasion was determined by the paint shaker method adapted to find the ratio of decrease in weight due to abrasion. The results are shown in Table 3.

TABLE 3

| Sample | Average rupture strength (kg) | Abrasion ratio (% by wight) |
|---|---|---|
| A | 6.4 | 0.08 |
| B | 8.2 | 0.05 |
| C | 10.0 | 0.05 |

It is noted from the results of Table 3 that the sodium.potassium A type zeolite showed high average rupture strength and low abrasion ratio. The data indicate that the desiccating agent in the refrigeration cycle does not easily sustain rupture or shed fine powder. As a result, the possibility of the sliding part of the compressor sustaining breakage owing to the formation of fine powder can be precluded.

As demonstrated above, the composition of this invention for use in the refrigeration cycle enjoys such features as adsorbing water without entraining decomposition of HFC32, excelling in thermal stability, and manifesting high mechanical strength. It is, therefore, particularly useful in the refrigeration cycle which contain HFC32.

Example 2

The refrigerating apparatus of this invention will be described below with respect to a refrigerator illustrated by way of example in FIG. 1. FIG. 1 is a diagram which illustrates a refrigeration cycle. A hydrofluorocarbon type refrigerant is compressed by a compressor 3 which is a compressing mechanism, cooled by being passed through a supporting-base pipe 4, a radiating pipe 5, and a clean pipe 6 which jointly form a condensing mechanism, forwarded through a drier 8, expanded by being passed through a capillary tube 1 which forms an expanding mechanism, evaporated in an evaporator 2 which forms an evaporating mechanism, and used to cool the interior of a refrigerator 7. The vapor of the refrigerant is again compressed by the compressor 3.

In this example, HFC32/HFC134a was used as a refrigerant, a polyol ester was used as a refrigerator oil, and a sodium.potassium A type zeolite whose capacity for adsorption of HFC32 as determined by the McBain method was not more than 1.0% by weight was packed in the drier 8. This sodium.potassium A type zeolite had a sodium content of 7.9% by weight and a potassium content of 6.5% by weight. The refrigerator was operated at 25° C. for 2,000 hours.

During this operation, the compressor 3 emitted no abnormal noise and the sliding part of the compressor sustained no breakage. After the completion of this operation, the capillary tube in the refrigeration cycle was disassembled and examined as to the occurrence of deposit. The interior of the capillary tube showed virtually no discernible sign of deposit. Further, the water content in the refrigerator oil showed no change before and after the operation. Thus, the refrigerating apparatus of this invention produces no deposit in the refrigeration cycle and excels in durability.

What is claimed is:

1. A mixture for use in a refrigeration cycle, comprising:
    a sodium.potassium A type zeolite having a sodium content of not less than 6% by weight, a potassium content of not less than 5% by weight, and a total sodium and potassium content in the range of from 13 to 20% by weight,
    difluoromethane, and
    a refrigerator oil.

2. The composition according to claim 1, wherein said sodium content is not less than 7% by weight, said potassium content is not less than 6% by weight, and said total sodium and potassium content is in the range of from 13 to 16% by weight.

3. The composition according to claim 1, wherein said sodium.potassium A type zeolite possesses a capacity for adsorption of difluoromethane of less than 2.77% by weight as determined by the McBain method.

4. A composition according to claim 1, wherein said sodium.potassium A type zeolite is a synthetic zeolite formed of sodium aluminosilicate and has an average pore diameter of not more than 0.3 nm.

5. The mixture according to claim 1, wherein said refrigerator oil is compatible with the difluoromethane.

6. The mixture according to claim 1, wherein said refrigerator oil contains at least one oil selected from the group consisting of polyester oils, polyether oils, fluorine oils, polyalkylene glycols and mineral oils.

7. A mixture for use in a refrigeration cycle, comprising:
    a sodium.potassium A type zeolite having a sodium content of not less than 6% by weight, a potassium content of not less than 5% by weight, and a total sodium and potassium content in the range of from 13 to 20% by weight,
    difluoromethane,
    at least one hydrofluorcarbon other than difluoromethane, and
    a refrigerator oil.

8. The mixture according to claim 7, wherein said refrigerator oil is compatible with the difluoromethane and the at least one hydrofluorocarbon.

9. The mixture according to claim 7, wherein said refrigerator oil contains at least one oil selected from the group consisting of polyester oils, polyether oils, fluorine oils, polyalkylene glycols and mineral oils.

* * * * *

UNITED STATES PATENT AND TRADEMARK OFFICE
CERTIFICATE OF CORRECTION

PATENT NO.: 5,879,581

DATED: March 9, 1999

INVENTOR(S): Shigeo Ushimaru

It is certified that an error appears in the above-identified patent and that said Letters Patent is hereby corrected as shown below:

Title page, Item [54], delete the title and replace with --DESICCATING AGENT FOR EFRIGERATION CYCLE--.

Title page Item [57], line 6 of the Abstract, change "sodium.potassium" to --sodium·potassium--.

Claim 3, column 7, line 26, change "sodium.potassium"to --sodium·potassium--.

Claim 4, column 8, line 2, change "sodium.potasium" to --sodium·potassium--.

Claim 7, column 8, line 12, change "sodium.potasium" to --sodium·potassium--.

Signed and Sealed this

Fourteenth Day of September, 1999

*Attest:*

Q. TODD DICKINSON

*Attesting Officer*  *Acting Commissioner of Patents and Trademarks*